No. 645,628. Patented Mar. 20, 1900.
L. L. PLETCHER.
VEHICLE BRAKE.
(Application filed Aug. 4, 1899.)

(No Model.)

Witnesses

Inventor
Levi L. Pletcher,
by H. B. Willson & Co.
Attorneys

UNITED STATES PATENT OFFICE.

LEVI L. PLETCHER, OF McCONNELSVILLE, OHIO.

VEHICLE-BRAKE.

SPECIFICATION forming part of Letters Patent No. 645,628, dated March 20, 1900.

Application filed August 4, 1899. Serial No. 726,081. (No model.)

*To all whom it may concern:*

Be it known that I, LEVI L. PLETCHER, a citizen of the United States, residing at McConnelsville, in the county of Morgan and State of Ohio, have invented certain new and useful Improvements in Vehicle-Brakes; and I do declare the following to be a full, clear, and exact description of the invention, such as will enable others skilled in the art to which it appertains to make and use the same.

The invention has relation to vehicle-brakes; and the object is to provide a brake of the drag type, which may be brought into engagement with the ground by a hand-lever extending within convenient reach of the driver and which will effectually check the speed or entirely stop the vehicle.

With this object in view the invention consists in certain features of construction and combination of parts, which will be hereinafter fully set forth.

Figure 1:
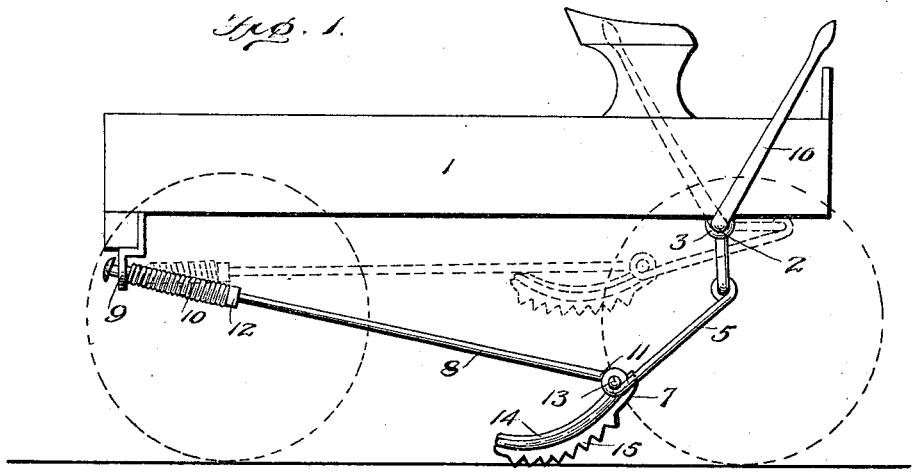
Figure 2:
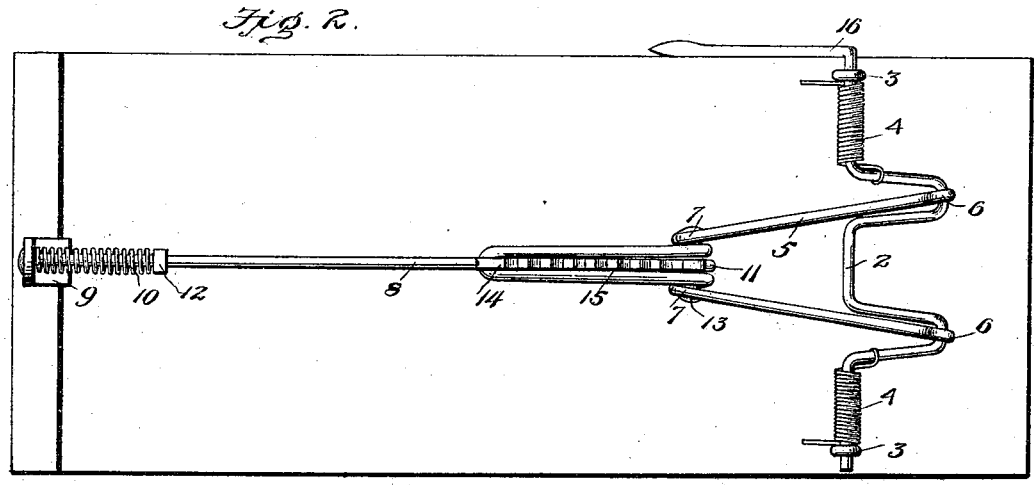
Figure 3:
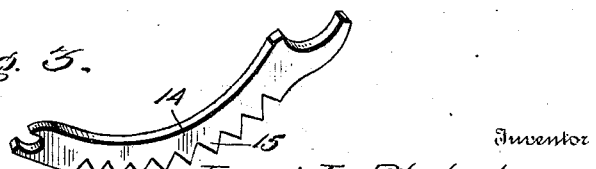

In the drawings, Figure 1 is a side elevation of a vehicle, illustrating my invention in use and showing in dotted lines the position it assumes when not in use. Fig. 2 is a bottom plan view of the braking mechanism. Fig. 3 is a detail perspective view of the drag-bar.

In the drawings, 1 represents the body of the vehicle.

2 denotes a crank-shaft journaled in bearings 3, secured to the under side of the body and provided with springs 4, the energy of which is exerted to force the crank of the shaft upward against the under side of the body.

5 denotes a fork having eyes 6, pivoted to the cranks of the shaft, and formed intermediate its ends with eyes 7. The lower end of the fork is preferably curved rearwardly, as shown.

8 denotes a rod the rear end of which has a sliding engagement in a bearing-bracket 9 against the action of a spring 10, confined between said bearing-bracket and a nut 12 on said rod. The forward end of this rod is formed with an eye 11, which lies between the eyes on the fork and is connected with said fork by a pivot-bolt 13, extending through the eyes of said fork and the eye of the rod.

14 denotes the drag bar or shoe, the under side of which is preferably curved and notched, as shown at 15. The rear end of the bar or shoe is notched to receive the bight of the fork, and the forward end is provided with a curved lip to partially surround the eye at the forward end of the rod and have a sliding engagement thereon when the brake is actuated.

16 denotes an operating-lever connected to the crank-shaft and projecting upwardly within convenient reach of the driver.

In operation when it is desired to check the speed or entirely stop the vehicle the operating-lever is grasped and forced forward. This throws the drag bar or shoe into engagement with the ground, thus offering a resistance to the forward movement of the vehicle. When the drag bar or shoe is suddenly brought into engagement with the ground, I have provided the spring at the rear end of the rod, so as to enable the fork, with its drag bar or shoe, to yield upwardly and prevent undue strain. Thus it will be seen that the brake force is controlled by said spring, the tension of which may be increased by adjusting the nut 12. It is understood that when the operating-lever is released the springs connected to the crank-shaft will return the parts to their normal position up against the under side of the wagon-body and out of the way.

Having thus described the invention, what I claim, and desire to secure by Letters Patent, is—

1. In a brake mechanism, the combination with the crank-shaft, a fork pivoted thereto and carrying a drag-shoe, a rod having one end pivoted to said fork and its other end pivoted to slide in a suitable bearing, and a spring for controlling the movement of said rod, substantially as set forth.

2. In a brake mechanism, the combination with the spring-actuated crank-shaft, a fork pivoted to said shaft, a drag-shoe carried at the lower end of the fork, a rod having its forward end pivoted to said fork and its rear end supported to slide longitudinally through a bearing, and a spring for controlling the movement of said rod, substantially as specified.

3. In a brake mechanism, the combination with the spring-actuated crank-shaft and its operating-handle, of a fork pivoted to said shaft and formed with eyes intermediate its ends, a rod having an eye at its forward end, a pivot-bolt passed through the eyes of the rod and fork, a drag-shoe having a notch in its lower end to engage the bight of the fork, and a lip at its upper end to engage and partially embrace the eye at the forward end of the rod, a bracket supporting the rear end of the rod, an adjustable nut secured upon the rod, and a coil-spring carried by the rod and confined between the nut and the bracket, substantially as set forth.

In testimony whereof I have hereunto set my hand in presence of two subscribing witnesses.

LEVI L. PLETCHER.

Witnesses:
JASPER BARRELL,
DUSTIN WADE.